(12) United States Patent
Ookura

(10) Patent No.: US 10,901,390 B2
(45) Date of Patent: Jan. 26, 2021

(54) NUMERICAL CONTROLLER

(71) Applicant: Fanuc Corporation, Yamanashi (JP)

(72) Inventor: Takuma Ookura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 32 days.

(21) Appl. No.: 16/273,656

(22) Filed: Feb. 12, 2019

(65) Prior Publication Data

US 2019/0265671 A1    Aug. 29, 2019

(30) Foreign Application Priority Data

Feb. 23, 2018  (JP) .................................. 2018-031201

(51) Int. Cl.
*G05D 3/12* (2006.01)
*G05B 19/23* (2006.01)
*H02P 5/52* (2016.01)

(52) U.S. Cl.
CPC .............. *G05B 19/23* (2013.01); *G05D 3/12* (2013.01); *H02P 5/52* (2013.01)

(58) Field of Classification Search
CPC .......... G05B 19/23; G05B 2219/50228; G05B 19/195; G05B 19/404; G05B 2219/34188; H02P 5/52; G05D 3/12
See application file for complete search history.

(56) References Cited

U.S. PATENT DOCUMENTS

| 5,181,441 A | 1/1993 | Okada |  |
| 5,920,169 A * | 7/1999 | Hamamura | G05B 19/404 |
| | | | 318/561 |
| 6,018,685 A | 1/2000 | Fujita et al. | |
| 2004/0180606 A1* | 9/2004 | Iwashita | H02P 5/52 |
| | | | 451/5 |
| 2010/0181955 A1* | 7/2010 | Maeda | G05B 19/404 |
| | | | 318/625 |
| 2010/0231158 A1 | 9/2010 | Jonsson | |
| 2015/0268658 A1* | 9/2015 | Sonoda | G05B 19/19 |
| | | | 318/570 |
| 2016/0370786 A1* | 12/2016 | Nagaoka | G05B 19/4062 |

(Continued)

FOREIGN PATENT DOCUMENTS

| JP | 01228752 A | 9/1989 |
| JP | 0465701 A | 3/1992 |
| JP | 1063320 A | 3/1998 |

(Continued)

OTHER PUBLICATIONS

Decision to Grant a Patent for Japanese Application No. 2018-031201, dated Feb. 25, 2020, with translation, 5 pages.

*Primary Examiner* — Thomas C Lee
*Assistant Examiner* — Gary Collins
(74) *Attorney, Agent, or Firm* — RatnerPrestia

(57) ABSTRACT

A numerical controller, which is configured to correct a machine position error based on a torque difference between a master axis and a slave axis, acquires the torque difference after movement of the master and slave axes that move in response to a movement command, and corrects the machine position error by a correction amount based on a value obtained by excluding a torque difference derived from a mechanical strain from the acquired torque difference. The corrected machine position error is added to the movement command for next time.

2 Claims, 9 Drawing Sheets

(56) References Cited

U.S. PATENT DOCUMENTS

2017/0052526 A1   2/2017  Yoshiura et al.
2017/0110993 A1*  4/2017  Hamel ................ H04B 5/0031

FOREIGN PATENT DOCUMENTS

| JP | 2003-263228 A | 9/2003 |
| JP | 2003271214 A  | 9/2003 |
| JP | 2017041075 A  | 2/2017 |

* cited by examiner

TORQUE DIFFERENCE : $\Delta T = T_M - (-T_S)$

NUMERICAL CONTROLLER

RELATED APPLICATIONS

The present application claims priority to Japanese Patent Application Number 2018-031201 filed Feb. 23, 2018, the disclosure of which is hereby incorporated by reference herein in its entirety.

BACKGROUND OF THE INVENTION

Field of the Invention

The present invention relates to a numerical controller, and more particularly, to a numerical controller configured to correct a machine position in feed-axis synchronization control.

Description of the Related Art

As shown in FIG. 1, there is a numerical controller that corrects a machine position in a machine tool using feed-axis synchronization of portals or the like. For example, Japanese Patent Application Laid-Open No. 2003-263228 describes synchronization control in a drive control device configured to synchronously drive a plurality of propeller shafts by means of servomotors to move moving parts that are threadedly engaged with the propeller shafts. According to this synchronization control, vibration generated by difference in mechanical stiffness between the propeller shafts is suppressed to improve the position accuracy and responsiveness of the device.

The conventional numerical controller sets a pitch error in a master axis and a slave axis according to pitch data of a ball screw and corrects the machine position. If the pitches of the master and slave axes are not aligned in synchronization control axes, the master and slave axes are deviated in position, so that a problem arises that the motor current is unstable, for example. Conventionally, therefore, the machine position is modified by measuring an actual machine position error by means of a laser measuring instrument or the like to make pitch error correction or the like, as shown in FIG. 2.

However, operations for measuring the pitches and measuring the actual machine position error by means of the laser measuring instrument or the like, in order to make the pitch error correction, take a lot of time. Although it is enough that the respective pitches of the master and slave axes can be set correctly, the pitches cannot easily be set because the slave axis depends on the master axis. Although some machine position corrections are made by using torque differences, as in the case described in Japanese Patent Application Laid-Open No. 2003-263228, accurate machine position correction cannot be performed in consideration of a mechanical strain. The mechanical strain described herein is a deviation of the machine position generated during the manufacture (casting) of parts.

SUMMARY OF THE INVENTION

The present invention has been made to solve the above problem and has an object to provide a numerical controller configured to correct a machine position in feed-axis synchronization control.

A numerical controller according to the present invention is configured to correct a machine position error based on a torque difference $\Delta T$ between a master axis and a slave axis and comprises a movement command unit configured to move the master axis and the slave axis in response to a movement command, a torque difference acquisition unit configured to acquire the torque difference $\Delta T$ after the movement, and a machine position error correction unit configured to correct a machine position error by a correction amount based on a value obtained by excluding a torque difference Tm derived from a mechanical strain from the torque difference $\Delta T$. The movement command unit adds the correction amount fed back from the machine position error correction unit to the movement command for next time.

The numerical controller may further comprise a correction amount calculation unit for calculating the torque difference Tm. The movement command unit may move the master axis and the slave axis to a plurality of observation points, the torque difference acquisition unit may measure the torque difference $\Delta T$ at each of the plurality of observation point, and the correction amount calculation unit may define an average of the torque differences $\Delta T$ measured individually at the plurality of observation points as the torque difference Tm.

According to the present invention, there can be provided a numerical controller configured to correct a machine position in feed-axis synchronization control.

DETAILED DESCRIPTION OF THE PREFERRED EMBODIMENTS

The following is a description of a configuration of a numerical controller 1 according to an embodiment of the present invention.

Figure 1:
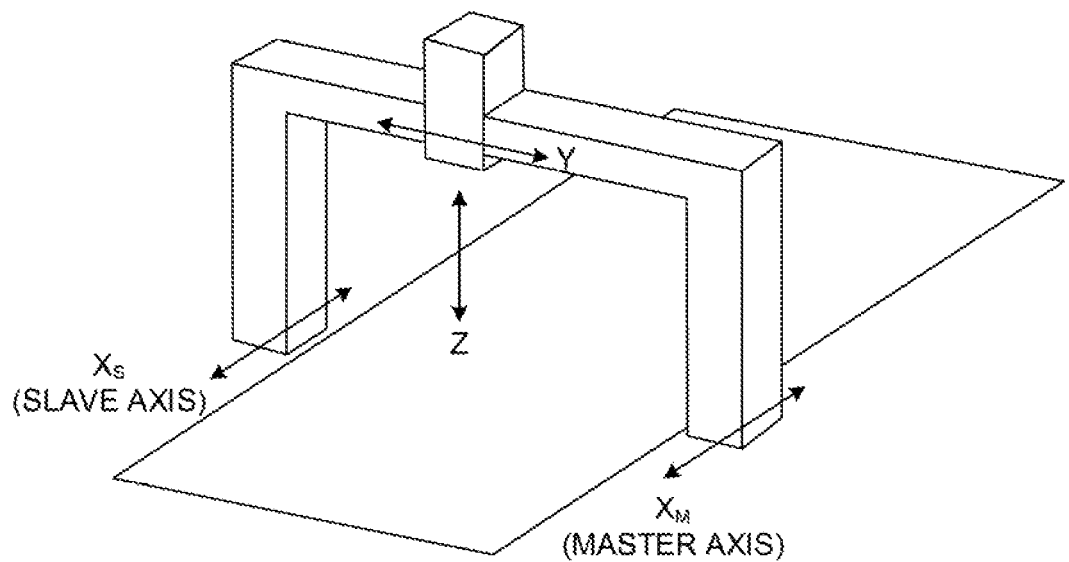
FIG. 1 is a diagram showing an example of a conventional numerical controller configured to make machine position error correction.
Figure 2:
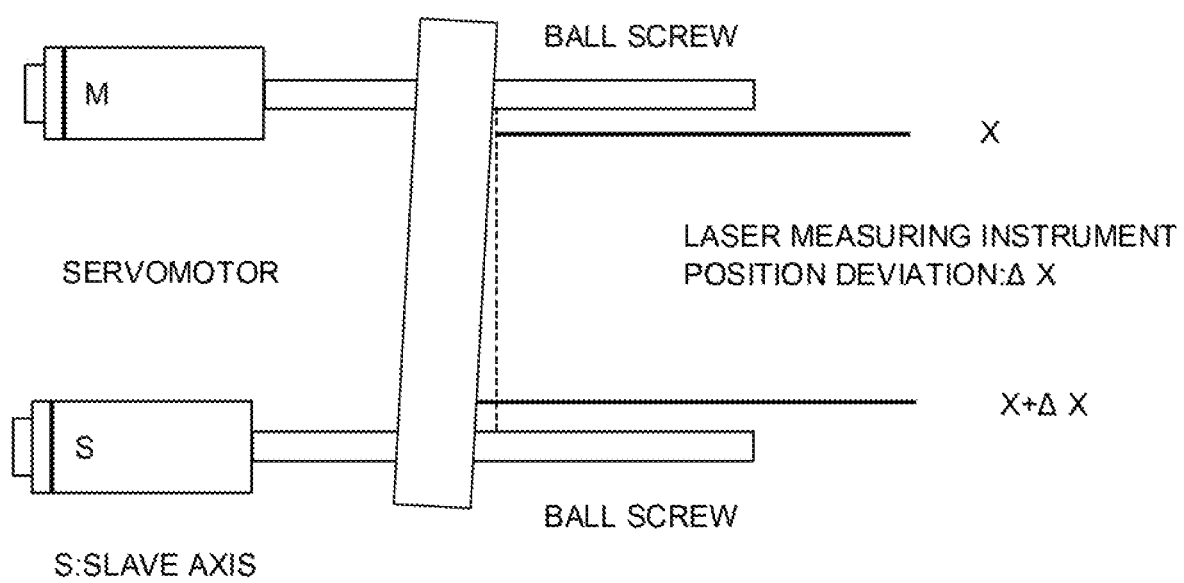
FIG. 2 is a diagram showing an example of a conventional machine position error correction method.

FIG. 1 is a schematic hardware configuration of principal parts of the numerical controller 1 according to the embodiment of the present invention.

A CPU 11 of the numerical controller 1 is a processor for generally controlling the numerical controller 1 and reads out a program stored in a non-volatile memory 14 through a bus 20 and controls the entire numerical controller 1 according to the program.

The non-volatile memory 14 is constructed, for example, as a memory that is backed up by a battery (not shown) so that its storage state can be maintained even when the numerical controller 1 is powered off, for example. Programs and data stored in the non-volatile memory 14 may be developed in a volatile memory 13 during use. The volatile memory 13 is loaded with temporary calculation data and display data, data input through an input device, and the like, as well as the programs and data developed from the non-volatile memory 14.

A display/MDI unit 70 is a data input/output device equipped with a display, keyboard, and the like. Commands and data input from the keyboard of the display/MDI unit 70 are delivered to the CPU 11 through an interface 15. Moreover, display data output from the CPU 11 is displayed on the display of the display/MDI unit 70 through the interface 15.

A servo controller 80 controls a servomotor that drives master and slave axes. A servomotor drive command output from the CPU 11 is transmitted to the servo controller 80 through an interface 16. The servo controller 80 transmits information such as a load on the servomotor to the CPU 11 through the interface 16.

Figure 12:
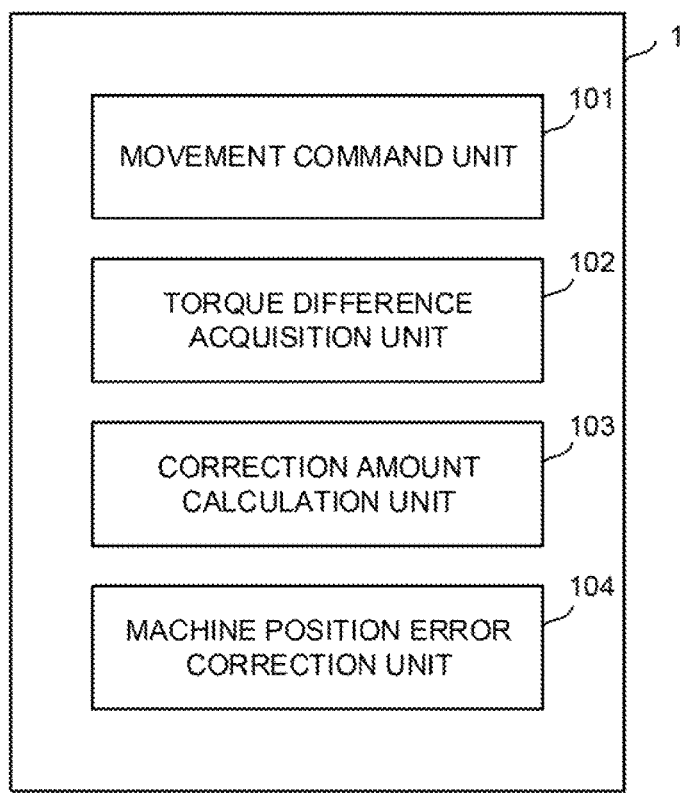
FIG. 12 is a block diagram showing a functional configuration of the numerical controller.

FIG. 12 is a block diagram showing a schematic functional configuration of the numerical controller 1 according to the embodiment of the present invention.

The numerical controller 1 comprises a movement command unit 101, a torque difference acquisition unit 102, a correction amount calculation unit 103, and a machine position error correction unit 104. The movement command unit 101 moves the master and slave axes. The torque difference acquisition unit 102 acquires a torque difference between the master and slave axes. The correction amount calculation unit 103 identifies torque differences derived from a mechanical strain, based on the torque differences acquired from a plurality of observation points and calculates an appropriate correction amount. The machine position error correction unit 104 corrects a machine position error based on the correction amount.

The basic concept of machine position error correction by the numerical controller 1 according to the present embodiment will be described with reference to FIGS. 3 to 5 and FIG. 10. The numerical controller 1 has two modes, a data acquisition mode and a correction mode.

Figure 3:
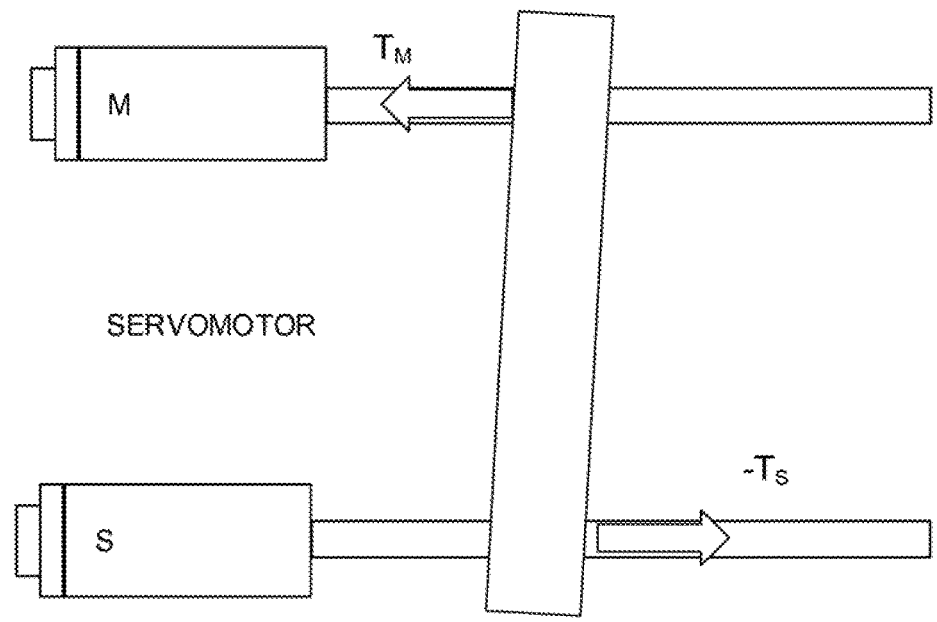
FIG. 3 is a diagram illustrating the machine position error correction method by the numerical controller.
Figure 10:
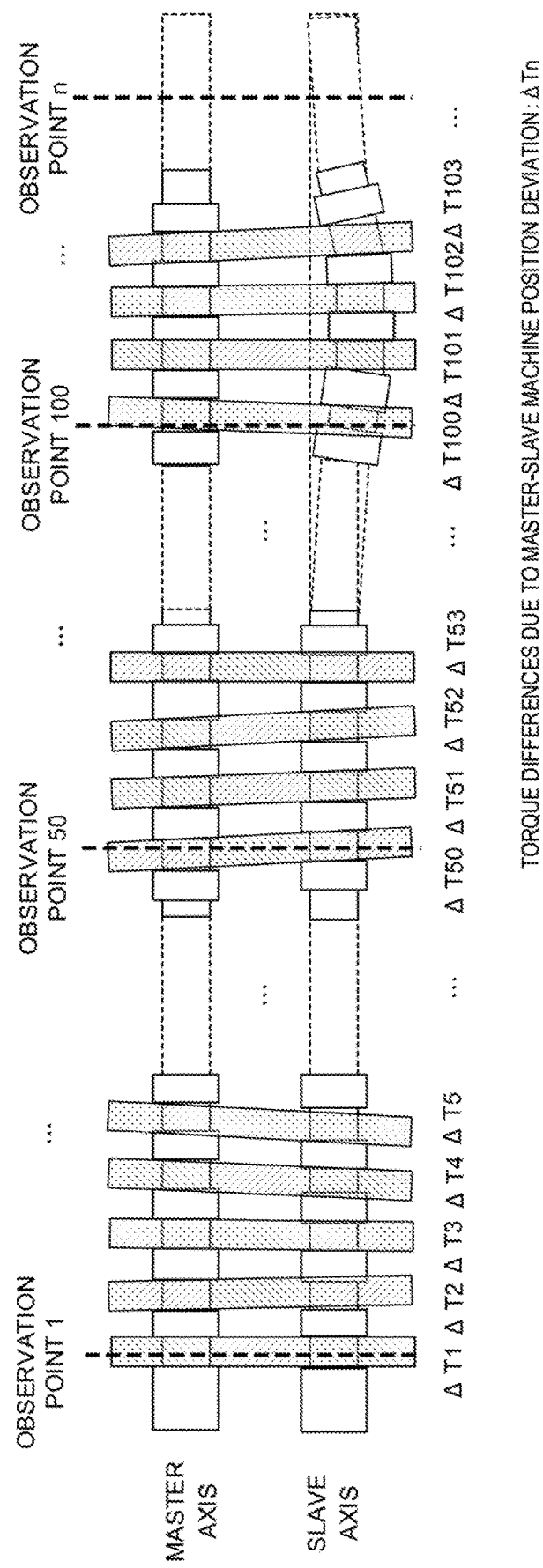
FIG. 10 is a diagram illustrating the machine position error correction method by the numerical controller.
Figure 11:
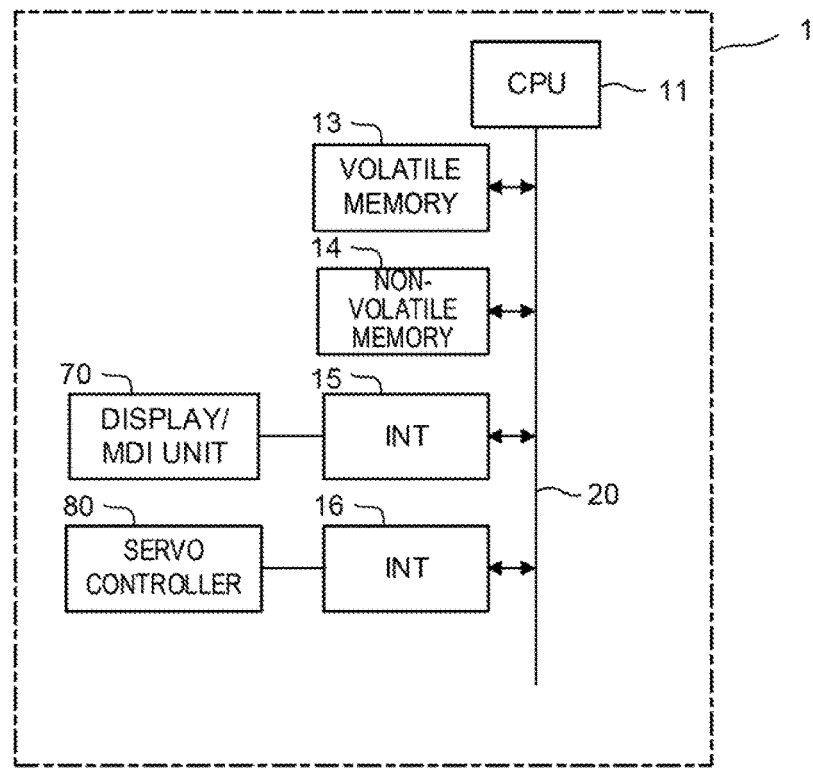
FIG. 11 is a hardware configuration diagram of the numerical controller.

In the data acquisition mode, the numerical controller 1 measures torque differences $\Delta T = T_M - (-T_S)$ between the master and slave axes, such as those shown in FIG. 3, at a plurality of observation points 1, 2, ..., n, as shown in FIG. 10. Here $T_M$ and $T_S$ are the torque values of the master and slave axes, respectively. The torque difference $\Delta T$ at each observation point includes both a component derived from a pitch error, torsion due to the workpiece load, and machine position deviation due to thermal displacement and a component derived from a mechanical strain peculiar to each machine.

Figure 4:
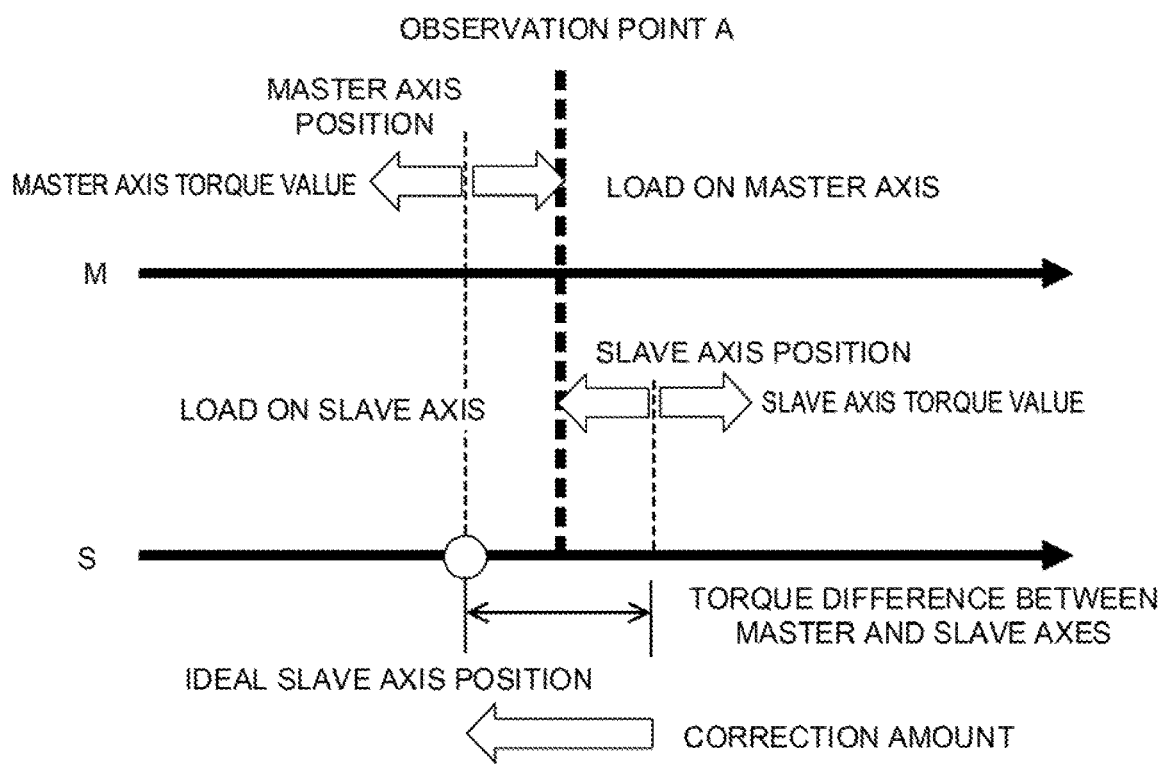
FIG. 4 is a diagram illustrating the machine position error correction method by the numerical controller.

In the correction mode, the numerical controller 1 makes correction to an optimal machine position by feeding back a correction value based on the torque differences $\Delta T$ to a movement command. Specifically, the numerical controller 1 makes machine position correction based on the torque differences $\Delta T$ every time the master and slave axes are operated. As shown in FIG. 4, the torque difference $\Delta T$ is generated between the master and slave axes due to a position deviation between the master and slave axes and the like at an operating position (assumed to be an observation position A). Synchronization control can be performed by using this torque difference $\Delta T$ as the correction value (i.e., by making correction so as not to burden the motor (load on the motor=0)).

Initially, the numerical controller 1 can make the machine position correction based on the torque differences $\Delta T$ at the individual observation points collectively acquired in the data acquisition mode. Thereafter, however, the numerical controller 1 can carry out, in real time, more precise machine position correction in consideration of the influences of the thermal displacement and the like that change at any time by performing the acquisition of the torque differences $\Delta T$ and the calculation and feedback of the correction value for each operation.

Figure 5:
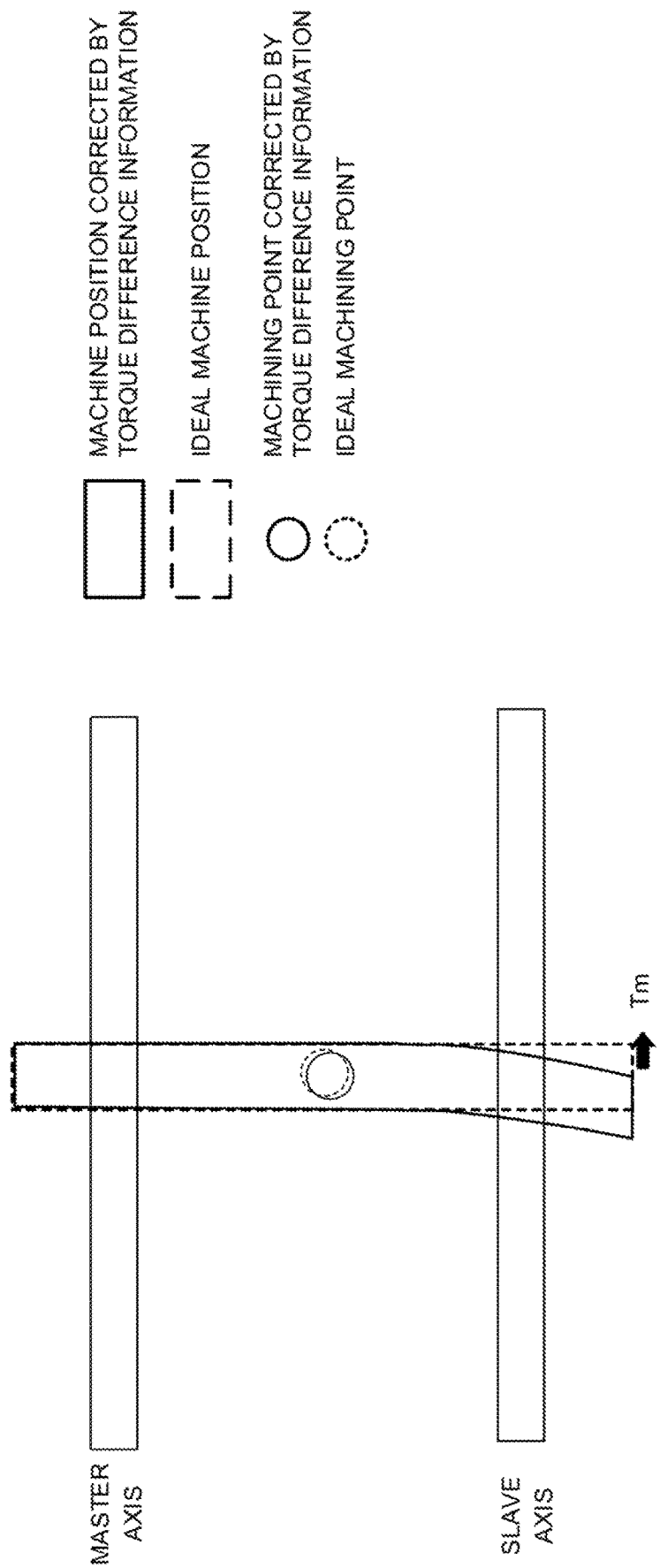
FIG. 5 is a diagram illustrating the machine position error correction method by the numerical controller.

Optimal synchronization control cannot be achieved by only making correction for a position where the torque differences $\Delta T$ are not generated in this manner. This is because the torque differences $\Delta T$ also include a torque load Tm that is generated by the mechanical strain. Specifically, if the machine position correction is made simply using the torque difference $\Delta T$ as the correction value, then an excessive correction is made by the amount corresponding to the torque load Tm, as shown in FIG. 5, so that the machining point is inevitably deviated from an ideal correction position. If a laser measuring instrument or the like is used for the machine position correction, positioning is performed so as to prevent the mechanical strain, so that this problem will not occur. In order to solve this problem peculiar to the machine position correction using the torque difference, processing should be performed so that the correction value does not involves Tm.

Figure 6:
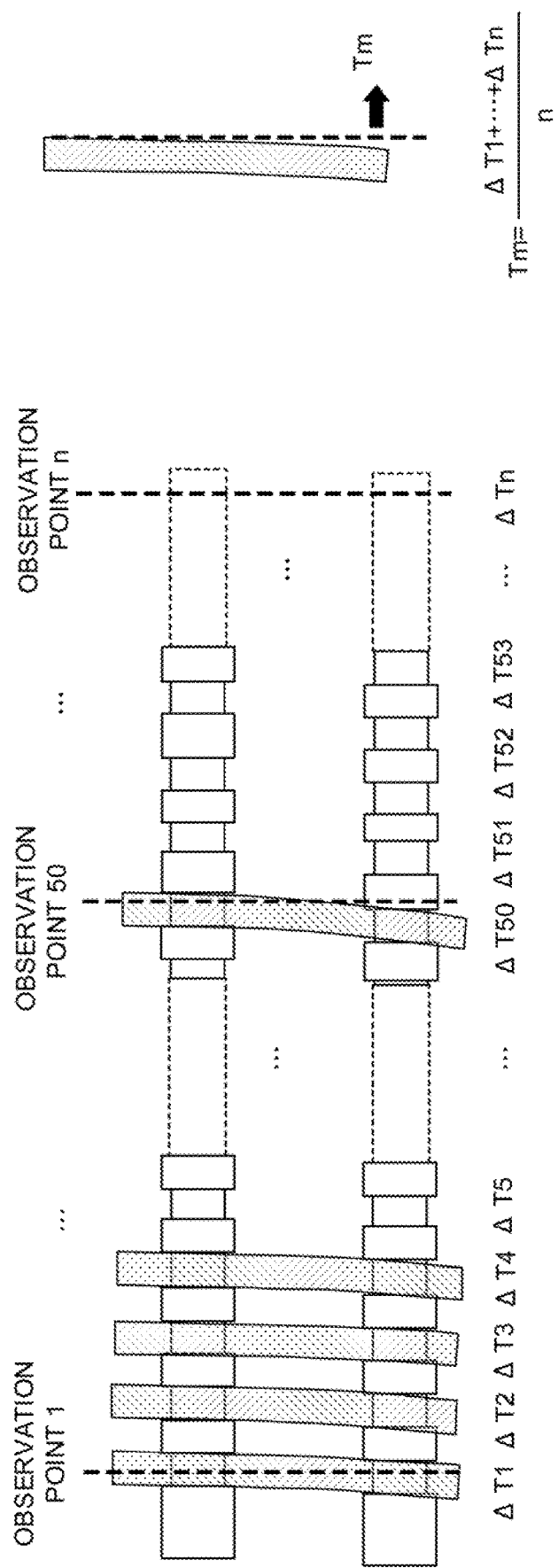
FIG. 6 is a diagram illustrating the machine position error correction method by the numerical controller.

After the torque differences $\Delta T$ are measured at a plurality of observation points in the data acquisition mode, therefore, the numerical controller 1 obtains a torque difference regularly applied at these observation points by calculation and regards it as the torque difference Tm derived from the mechanical strain. More specifically, the numerical controller 1 acquires torque differences $\Delta T1, \Delta T2, \ldots, \Delta Tn$ between the master and slave axes at observation points 1, 2, ..., n, as shown in FIG. 6. Then, the numerical controller 1 obtains the average Tm of these torque differences, that is, obtains the Tm according to Equation (1) as follows:

$$Tm=(\Delta T1+\Delta T2+ \ldots +\Delta Tn)/n, \qquad (1)$$

The numerical controller 1 then performs the machine position correction using the correction value obtained by excluding the torque difference Tm from the torque difference $\Delta T$, without correcting the Tm derived from the mechanical strain. In this way, the machining point can be placed in the ideal position by keeping the machine straight without failing to give the necessary torque difference Tm for the correction of the mechanical strain and by correcting only the pitch error, the torsion due to the workpiece load, and the machine position deviation due to the thermal displacement.

The operation of the numerical controller 1 will be described in time-series order with reference to FIGS. 7 and 8.

Figure 7:
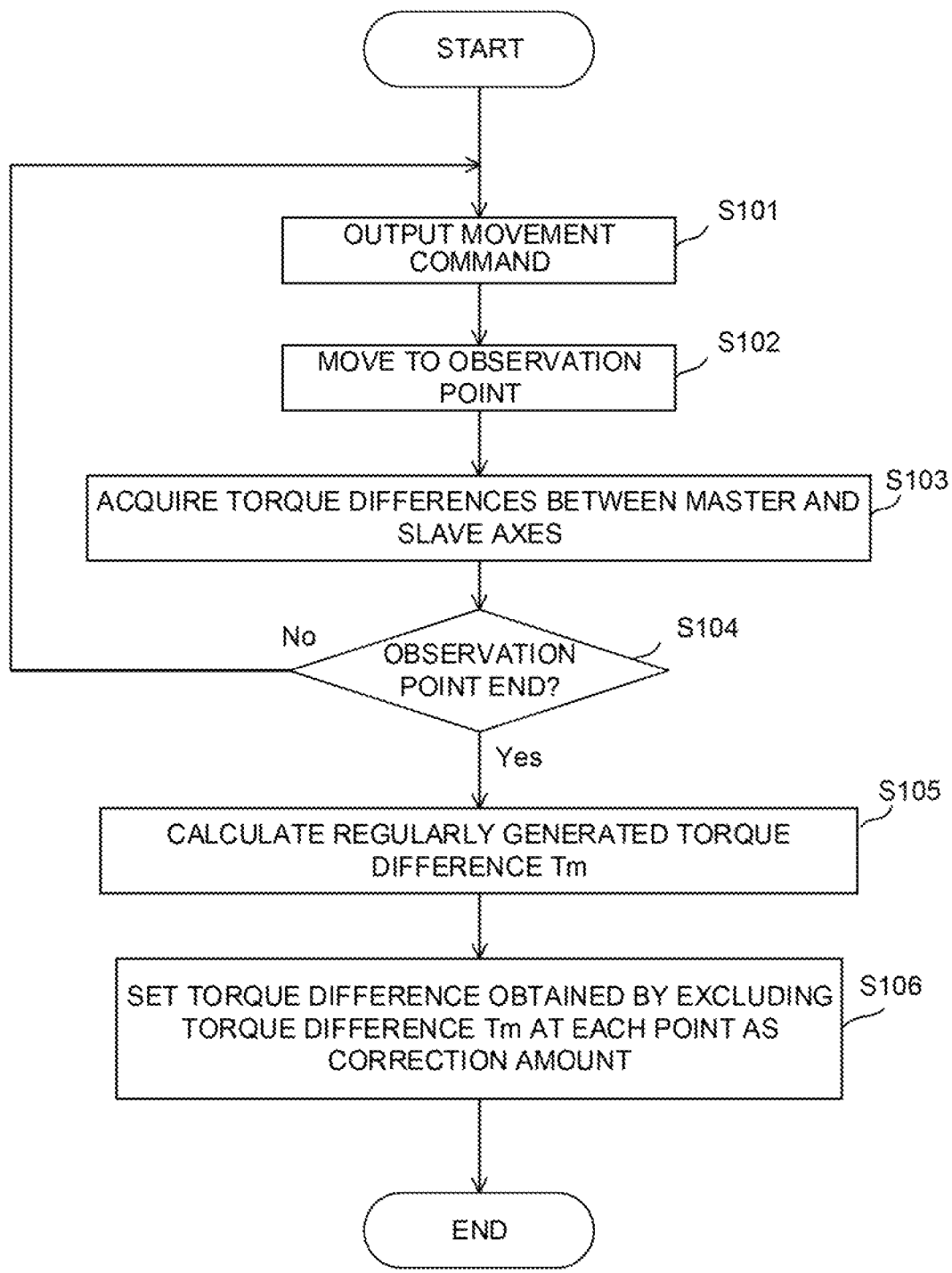
FIG. 7 is a flowchart showing the operation of the numerical controller.

FIG. 7 is a flowchart showing the operation of the numerical controller 1 in the data acquisition mode. Typically, the numerical controller 1 performs the operation in the data acquisition mode before the start of machining and acquires torque differences statically generated at a plurality of observation points, that is, torque differences mainly due to the pitch error, mechanical strain, and the like without any influence of the workpiece load or the thermal displacement. Moreover, the numerical controller 1 calculates the torque difference Tm regularly generated at each observation point and identifies the torque difference component derived from the mechanical strain.

Step S101: The movement command unit 101 outputs the movement command up to a predetermined observation point to the servomotor for the master and slave axes.

Step S102: In response to the movement command of Step S101, the servomotor for the master and slave axes is driven to move the machine to the observation point.

Step S103: The torque difference acquisition unit 102 acquires the torque differences ΔT between the master and slave axes.

Step S104: When the processing of Steps S101 to 103 is performed for all the observation points (n in number), the program proceeds to S105. In other cases, the program returns to Step S101, whereupon the same processing is repeated for the next observation point.

Step S105: The storage unit 105 obtains the average Tm of the torque differences ΔT acquired individually at the n number of observation points by inserting a cutting in/out motion into lathe turning. The average Tm is a torque difference regularly generated at every observation point and can be assumed to be a torque difference attributable to the mechanical strain.

Step S106: The correction amount calculation unit 103 calculates a correction amount for each observation point and saves it into a predetermined storage area in the volatile memory 13 or the like. The correction amount can be calculated based on a torque difference obtained by excluding the torque difference Tm derived from the mechanical strain from the torque differences statically generated at the individual observation points. If the torque differences at the observation points 1, 2, . . . , n are ΔT1, ΔT2, . . . , ΔTn, respectively, correction amounts at the observation points 1, 2, . . . , n are determined based on ΔT1−Tm, ΔT2−Tm, . . . , ΔTn−Tm, respectively.

Figure 9:
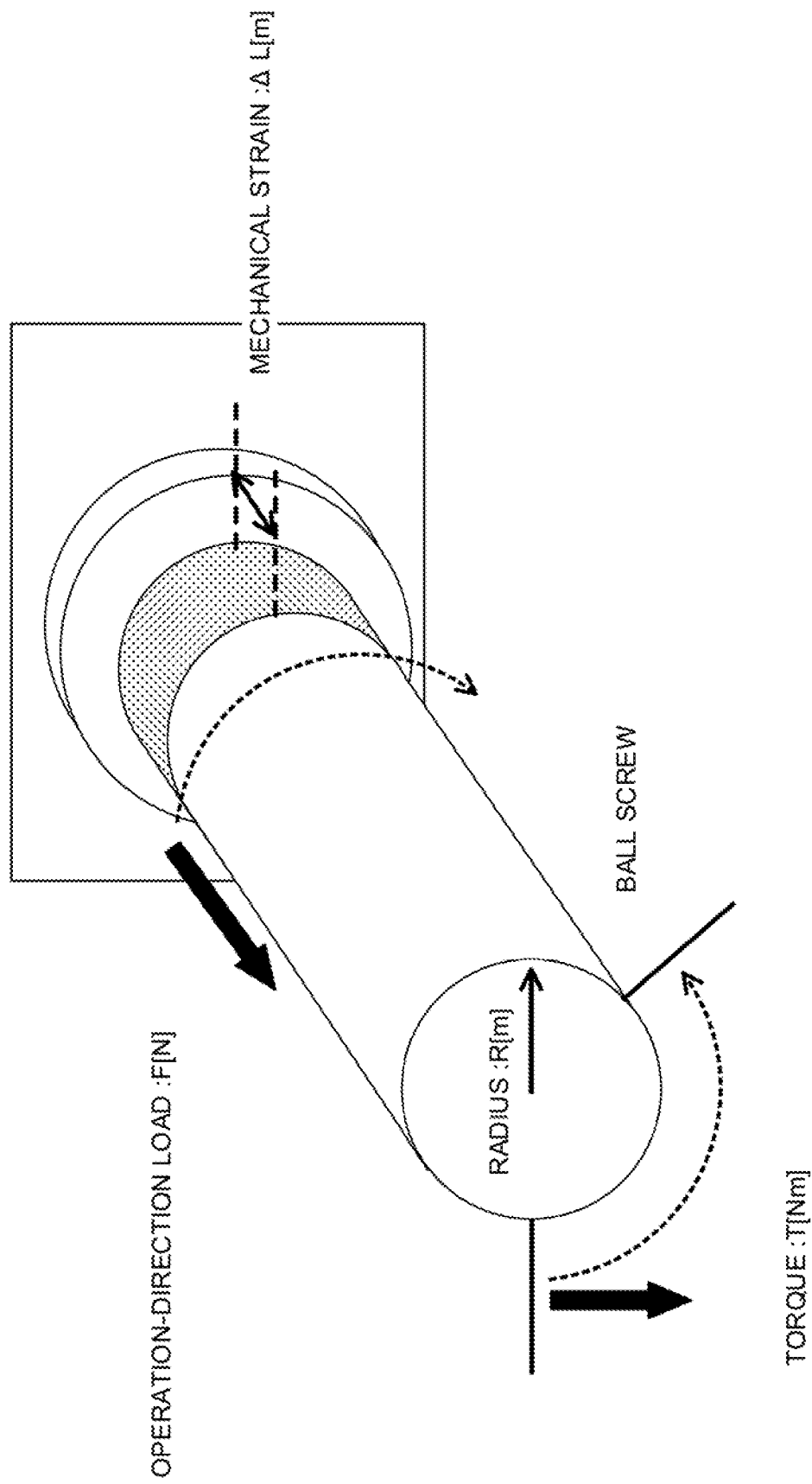
FIG. 9 is a diagram illustrating a method of calculating correction amounts.

A method of calculating the correction amounts based on the torque differences will now be described with reference to FIG. 9.

The correction amount calculation unit 103 first obtains a load F[N] due to the machine position deviation from a torque T[Nm]. Then, it calculates a mechanical strain ΔL[m] caused by the load F[N]. This mechanical strain ΔL[m] is the correction amount.

The relationship between the torque T[Nm] and the load F[N] can be obtained according to Equation (2) below. Moreover, the relationship between the load F[N] and a stress can be obtained according to Equation (3) below. The correspondence between the stress and the mechanical strain ΔL[m] is assumed to be given as a stress-strain curve in advance.

$$T=[(F \times Pb/2\pi \times \eta)+(\mu 0 \times F0 \times Pb/2\pi)]/Sf/i, \quad (2)$$

$$F=\text{Stress} \times mg(\sin \theta + \mu \cos \theta). \quad (3)$$

Here m is the weight of a table and a workpiece; Pb: lead of a ball screw, i: reduction ratio, F0: preload on the ball screw, μ: friction factor of a sliding surface, μ0: internal friction factor of a preload nut, Sf: safety factor, and θ: angle of inclination of the ball screw.

Figure 8:
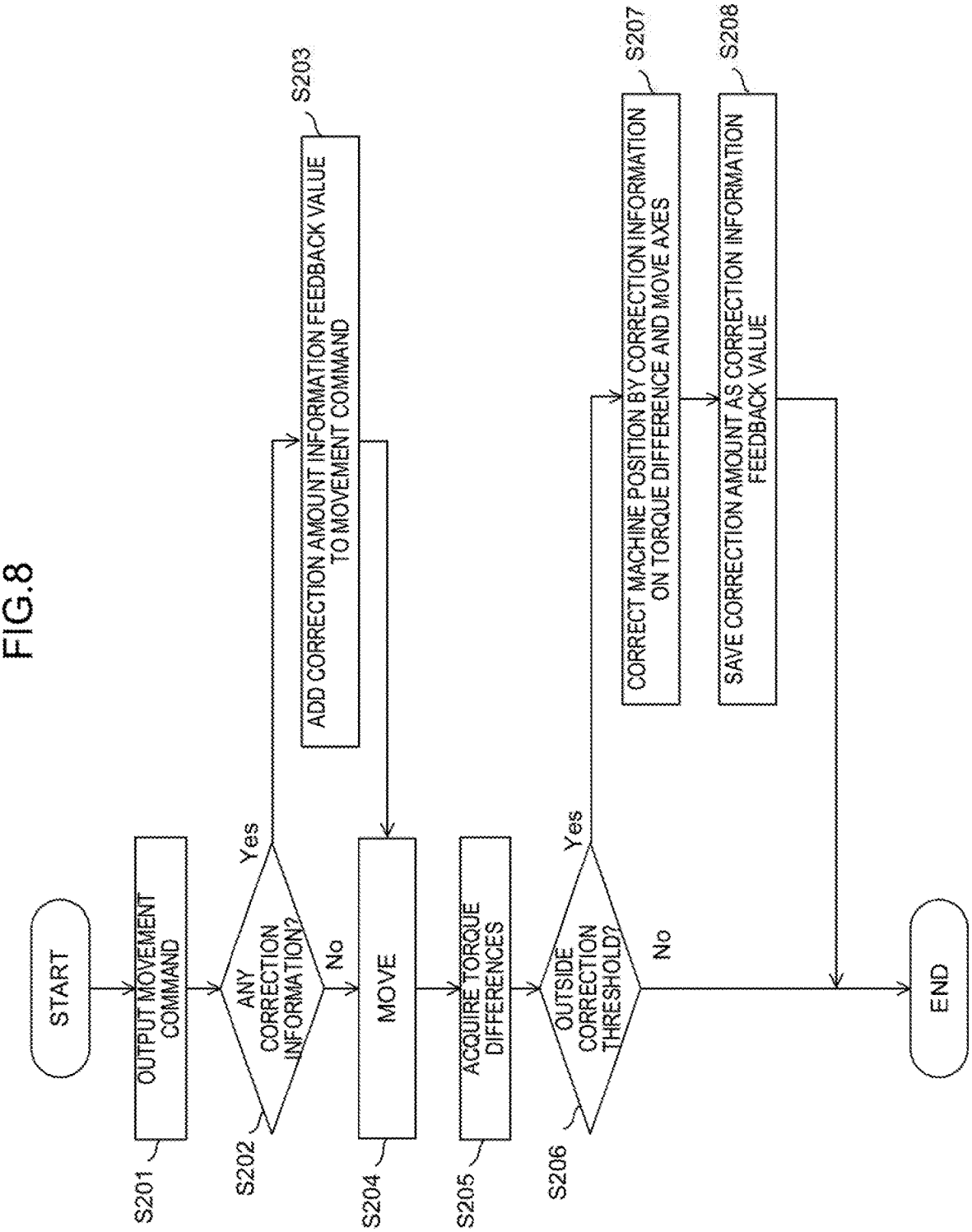
FIG. 8 is a flowchart showing the operation of the numerical controller.

FIG. 8 is a flowchart showing the operation of the numerical controller 1 in the correction mode. During machining, the numerical controller 1 performs a correction-mode operation and makes real-time correction in consideration of torque differences due to the influences of dynamically generated torque differences, that is, the workpiece load and the thermal displacement. In doing this, the numerical controller 1 does not corrects the torque difference Tm due to the mechanical strain.

Step S201: The movement command unit 101 outputs the movement command up to a predetermined observation point to the servomotor for the master and slave axes.

Step S202: The machine position error correction unit 104 confirms whether or not any correction information exists with reference to a predetermined storage area. The correction information is the correction amount (hereinafter referred to as the initial correction amount) at each observation point saved in Step S106 of the flowchart of FIG. 7 or a correction information feedback value described below. If the correction information exists, the program proceeds to S203, and then, the processing of Step S204 is performed. If there is no correction information, the program proceeds to S204.

Step S203: If the correction information feedback value exists, the machine position error correction unit 104 adds it to the movement command. If no correction information feedback value exists, the initial correction value at a destination observation point is added to the movement command.

Step S204: In response to the movement command of Step S201 or the movement command corrected in Step S203, the servomotors for the master and slave axes are driven to move the machine to the observation point.

Step S205: The torque difference acquisition unit 102 acquires the torque differences ΔT between the master and slave axes.

Step S206: The machine position error correction unit 104 determines whether or not the torque differences ΔT acquired in Step S205 exceed a predetermined correction threshold. If the correction threshold is exceeded, the program proceeds to S207. If not, this processing ends.

Step S207: The machine position error correction unit 104 corrects the machine position based on a correction amount (ΔT−Tm) obtained by excluding the torque difference Tm derived from mechanical strain from the torque difference ΔT.

Step S208: The machine position error correction unit 104 saves the correction amount used in Step S207 as the correction information feedback value into a predetermined storage area.

The correction information feedback value saved here is used in the processing of Step S203 at the time of the next execution of the movement command. Thus, the numerical controller 1 executes the movement command in consideration of the previous correction amount, so that the generated machine position error can be reduced. As the movement command is executed repeatedly, the correction continues to be made following the dynamically generated machine position error such as the thermal displacement.

According to the present embodiment, the numerical controller 1 calculates the torque difference Tm regularly generated in a plurality of observation points in the data acquisition mode. In this way, the torque difference derived from the mechanical strain can be identified. During the execution of the movement command, the machine position error is corrected based on the correction amount (ΔT−Tm) obtained by excluding the torque difference Tm derived from mechanical strain from the actually acquired torque difference ΔT, so that appropriate correction free from the influence of the mechanical strain can be made.

Moreover, according to the present embodiment, the numerical controller 1 feeds back the previous correction amount as the correction information feedback value and executes the movement command in consideration of the previous and preceding correction amounts, so that it can perform sophisticated and efficient correction following the dynamically generated machine position error such as the thermal displacement.

The present invention is not limited to the above-described embodiment and can be suitably modified and embodied in various forms. For example, in the present embodiment, the value Tm is obtained by acquiring the torque differences ΔT at a plurality of observation points in the data acquisition mode and calculating their average. However, the present invention is not limited to this and the torque difference Tm derived from the mechanical strain may be obtained by an alternative method. For example, the torque difference ΔT may be acquired with the machine position modified by means of a conventional laser measuring instrument so that it can be used as the Tm.

The invention claimed is:

1. A numerical controller configured to correct a machine position error based on a torque difference ΔT between a master axis and a slave axis, the numerical controller comprising:
a processor configured to:
move the master axis and the slave axis in response to a movement command;
acquire the torque difference ΔT between the master axis and the slave axis after the movement; and
correct a machine position error by a correction amount based on a value obtained by excluding a torque difference Tm derived from a mechanical strain from the torque difference ΔT between the master axis and the slave axis,
wherein the processor is further configured to add the correction amount based on the value obtained by excluding the torque difference Tm as feedback to the movement command in consideration for a next execution of the movement command.

2. A numerical controller configured to correct a machine position error based on a torque difference ΔT between a master axis and a slave axis, the numerical controller comprising:
a processor configured to:
move the master axis and the slave axis in response to a movement command;
acquire the torque difference ΔT after the movement;
correct a machine position error by a correction amount based on a value obtained by excluding a torque difference Tm derived from a mechanical strain from the torque difference ΔT,
wherein the processor adds the correction amount fed back from the processor to the movement command for next time, and
calculate the torque difference Tm, wherein the processor moves the master axis and the slave axis to a plurality of observation points,
measures the torque difference ΔT at each of the plurality of observation point, and
defines an average of the torque differences ΔT measured individually at the plurality of observation points as the torque difference Tm.

* * * * *